United States Patent [19]

Sato et al.

[11] 4,277,508

[45] Jul. 7, 1981

[54] CURED MEAT PRODUCT AND PROCESS FOR PREPARING THE SAME

[75] Inventors: Kunito Sato; Alfred F. Miller; Leonard J. Zimont, all of Scottsdale, Ariz.

[73] Assignee: Armour and Company, Phoenix, Ariz.

[21] Appl. No.: 73,729

[22] Filed: Sep. 10, 1979

[51] Int. Cl.³ .......................... A23B 4/02; A23B 4/14
[52] U.S. Cl. .................................. 426/266; 426/332; 426/641; 426/646; 426/652
[58] Field of Search ............... 426/264, 265, 266, 641, 426/646, 652, 281, 331, 332, 647

[56] References Cited

U.S. PATENT DOCUMENTS

| | | | |
|---|---|---|---|
| 2,031,243 | 2/1936 | Wolf | 426/266 |
| 2,910,369 | 10/1959 | Klein | 426/266 |
| 2,955,042 | 10/1960 | Firor et al. | 426/332 X |
| 3,099,566 | 7/1963 | Flesch et al. | 426/266 |
| 3,108,880 | 10/1963 | Wierbicki et al. | 426/266 |
| 3,231,392 | 1/1966 | Sair | 426/266 |
| 3,391,008 | 7/1968 | Luck | 426/332 X |
| 3,482,985 | 12/1969 | Burgess et al. | 426/331 X |
| 3,515,561 | 6/1970 | Flesch et al. | 426/265 |
| 3,810,998 | 5/1974 | Sato et al. | 426/332 |
| 3,821,444 | 6/1974 | Sato et al. | 426/266 X |
| 3,857,981 | 12/1974 | Sato et al. | 426/265 |
| 3,867,558 | 2/1975 | Sato et al. | 426/265 |
| 3,899,600 | 8/1975 | Sweet | 426/266 X |
| 3,939,288 | 2/1976 | Sato et al. | 426/332 |
| 3,943,263 | 3/1976 | Sato et al. | 426/266 X |
| 3,958,019 | 5/1976 | Sato et al. | 426/268 X |
| 4,053,649 | 10/1977 | Svacik | 426/266 |

OTHER PUBLICATIONS

American Hoechst Product Data Sheet No. 5118, "Sorbiace Pak", pp. 3, 9–1970.
Tompkin et al., "Effect of Potassium Sorbate on Salmonellae, Staphylococcus aureus, Chlostridium perfringens, and Chlorstridium botulinum in Cooked, Uncured Sausage", Applied Microbiology, vol. 28, No. 2, 8-1974, pp. 262–264.

*Primary Examiner*—Arthur L. Corbin
*Attorney, Agent, or Firm*—Frank T. Barber; Carl C. Batz

[57] ABSTRACT

A process for the preparation of cured meat porducts, which have the characteristic color of high quality cured meats and which are able to retain this color during an extended period during which distribution and marketing of the meats may take place which process includes the step of incorporating calcium sorbate and sodium nitrate. The inventionalso refers to the meat products so produced and whichcontain calcium sorbate for facilatating the developmentand maintenance of the characteristic color associated with good quality cured meats.

9 Claims, No Drawings

CURED MEAT PRODUCT AND PROCESS FOR PREPARING THE SAME

This invention relates to processes for preparing cured meat and to the products so prepared. More particularly, the invention relates to the preparation of cured meats in which the meats obtain a bright pink color and then retain this color until the meats are marketed and come to be used by the consumer.

BACKGROUND

It is common practice in the preparation of cured meats to treat meat with a curing agent, more particularly sodium nitrite, which may be used alone or along with sodium erythorbate. The erythorbate is believed to speed the formation of the cured color or to serve as an antioxidant.

In using current operating procedures for the manufacture of certain cured meat products, sodium nitrite levels of 140 ppm to 156 ppm are routinely used to bring about cured color development. Especially when sodium nitrite levels lower than that specified in the current manufacturing procedures are used, the initial cured color which develops becomes susceptible to fading, and undesirable discoloration of the product occurs during storage and upon exposure to display case lights.

Accordingly, we have set about to discover new processes or alterations in the ingredients involved in the curing procedure which will facilitate the development of the bright pink color which has been associated with the best quality of cured meat and which will stabilize this color so that the color is maintained for an extended period of time, even with initial reduced levels of sodium nitrite, and even when the product is exposed to lights in display cases.

SUMMARY

We have discovered that if we incorporate into the meat to be cured an amount of calcium sorbate in addition to sodium nitrite or in addition to sodium nitrite and sodium erythorbate we obtain a cured meat having the desired bright pink color and which will retain this color for a substantially longer period of time. This development of cured color and color stabilization is accomplished with reduced levels of sodium nitrite by the addition of calcium sorbate to the meat.

This discovery was surprising to us because, for one reason, the art has been taught to believe that the insoluble salts of calcium containing no free calcium ions have no effect on color. See Wierbicki et al, U.S. Pat. No. 3,108,880. Calcium sorbate is, for practical purposes, insoluble in water, oils, or oil solvents. See Data Sheet no. 5118 (September, 1970) distributed by American Hoechst, a supplier of calcium sorbate.

DISCLOSURE

Our invention is particularly applicable to pork and to products containing pork including sausage, but it is applicable also to other meats such as beef and lamb.

When we incorporate into the meat to be cured the calcium sorbate according to this invention, we may add also the usual amounts of sodium nitrite but we find that the amounts of sodium nitrite can be reduced while still producing the desired results in the curing operation. The sodium nitrite may be in the amount of from 0.0020 to 0.0156% by weight based on the weight of the meat.

The meat to be cured may be assembled in the usual way. For preparing bologna a typical formula would include 44 pounds of 50% beef trimmings and 56 pounds of lean picnic trimmings; and for preparing salami may be 26.7 pounds of beef hearts, 22.0 pounds of 50% beef trimmings and 51.3 pounds of 75% lean beef trimmings.

The meat, when assembled, may be suitably ground and placed in a mixer. Ice and/or water may be added to bring down the temperature to about 28° F. to 30° F. To this mixture we add sodium chloride in an amount of from 2% to 4%, depending upon taste, and we may add any spices that we may wish to include. When sodium erythorbate is added, this may be added in the amount of from 0.0313% to 0.0625% by weight based on the weight of the meat. We find that when calcium sorbate is also added, the amount of sodium nitrite may be reduced to an amount of about 0.005% to 0.01% by weight based on the weight of the meat.

After the mixer has been operating for a few minutes we may add the calcium sorbate suitably in the form of a dry powder while the mixer is operating. The amount of calcium sorbate may be from about 0.01% to 0.8%, preferably from about 0.1% to 0.4%, these percentages being by weight based on the weight of the meat.

When the ingredients are well mixed the mixture is emulsified. The resulting emulsion may be stuffed into fibrous casings and the stuffed casings preferably held in a cooler at about 36° to 38° F. for at least about six hours after which they may be processed into the finished product in accordance with established procedures.

Following are specific examples demonstrating specific ways for carrying out our invention and the effect of varied conditions on the benefits being received.

EXAMPLE I

Preparation of Bologna

The meats which in this instance included 56 pounds of lean picnic trimmings and 44 pounds of 50% beef trimmings were ground through a 1-inch plate and the ground meat placed in a mixer. Ice water was added to the ground meat and mixed for about five minutes to bring the temperature down to 28° F. Sodium nitrite was added in the amount of 0.005% followed by the addition of sodium erythorbate in the amount of 0.0469%, and the spices which in this case included paprika and common salt in the amount of 3.25%, all percentages being given by weight based on the weight of the meat. The entire mixture was further chopped, and during the chopping step calcium sorbate in the amount of 0.2%, based on the weight of the meat, in the form of a dry powder, was slowly added. This mixture was then processed into the finished product in accordance with established procedures.

EXAMPLE II

Preparation of Cooked Salami

The meats, which included 26.7 pounds of beef hearts, 22.0 pounds of 50% beef trimmings and 51.3 pounds of 75% lean beef trimmings, were ground through a 1-inch plate and reground further through a ⅛-inch plate. All the meats were placed in a mixer along with 18 pounds of ice water. To this mixture was added all of the spices, sodium nitrite in the amount of 0.0075% and sodium erythorbate in the amount of 0.0469%. All percentages were by weight based on the weight of the meat. The meat spice mixture (including common salt) was mixed for five minutes. Then calcium sorbate was added slowly as a dry mixture and as the mixer continued to operate. This special meat mixture was allowed to cure overnight in a 36°–38° F. cooler. The meat mixture was then stuffed into fibrous casings and held 7 hours at a temperature between 36° and 38° F. before processing. The stuffed emulsion was then processed into the cooked salami product in accordance with usual procedures.

EXAMPLE III

Comparison of Cured Pork Containing Calcium Sorbate with the Same Product without Calcium Sorbate Meat from a fresh ham was ground using a 1-inch plate followed by a ⅛-inch plate and calcium sorbate, in the amount of 0.41% was mixed thoroughly into 100 grams of meat along with 2.5% sodium chloride and 0.01% of nitrite. To another portion of ground lean pork which served as a control was added 0.01% sodium nitrite and 2.5% sodium chloride, but without the calcium sorbate. All percentages were by weight based on the weight of the meat. Approximately 25 gram aliquots from the treated and the control meats were selected and each of the aliquots were heated at 158° F. for 40 minutes. Then we compared the cured color of the ground lean pork made using calcium sorbate with the ground lean pork made without the use of calcium sorbate. The results of these comparisons is given in the following table.

TABLE I

COMPARISON OF CURED PORK CONTAINING CALCIUM SORBATE WITH THE SAME PRODUCT WITHOUT CALCIUM SORBATE

| Treatment | Days stored at 38° F. in the dark | | | | |
|---|---|---|---|---|---|
| | 0 | 1 | 4 | 7 | 15 |
| Using calcium sorbate + (0.41%) sodium nitrite (0.01%) + sodium chloride (2.5%) | bright pink | bright pink | bright pink | bright pink | pink |
| Using sodium nitrite and sodium chloride as above but without calcium sorbate | pink | pale pink | pale pink | pale pink | brown with trace of pink |

EXAMPLE IV

In Example III, above, the ground meat mixture was wrapped in polyethylene film. We repeated the procedure of Example II except for packaging by drawing a vacuum after the heat treatment and sealing the Saran pouch under vacuum. Improvement in the color of the resulting packaged meat due to the addition of calcium sorbate was definitely apparent, but not as striking as in the case of Example III. The portion containing the calcium sorbate remained pink while the control portion turned to a dull pink after 6 days.

EXAMPLE V

We repeated the Example III except for increasing the amount of sodium nitrite to 0.0125%, this percentage being by weight based on the weight of the meat. The portion which included the calcium sorbate was at first a bright pink, whereas the control was a slightly dull pink and this difference existed throughout the two week period covered by the test.

EXAMPLE VI

We repeated Example III except for decreasing the amount of calcium sorbate to 0.2%, this percentage being by weight based on the weight of the meat. The portion which contained calcium sorbate was immediately bright pink and remained pink throughout the 2 week test. The portion which contained no calcium sorbate was initially pink but after 1 day was a pale pink and remained pale pink throughout the remainder of the period.

EXAMPLE VII

The procedure of Example III was repeated except that the amount of sodium nitrite in both portions was reduced to 0.005%, and sodium erythorbate was added in the amount of 0.0469%, these percentages being by weight based on the weight of the meat. The portion containing no calcium sorbate was immediately pink and remained this color throughout the period of the test. The portion which contained calcium sorbate was immediately a bright pink and remained this bright pink throughout the period of the test.

EXAMPLE VIII

The procedure for the preparation of cooked salami was carried out as described herein. To one portion of the meat 0.0075% of sodium nitrite was added without adding calcium sorbate. To another portion the same amount of sodium nitrite was added, and 0.0469% sodium erythorbate and 0.1% of calcium sorbate was also added. These percentages were by weight based on the weight of the meat. The control portion, without calcium sorbate, was immediately a bright purple-red, but after 22 days a tint of brown appeared which persisted during the 33 day period of the test. The portion containing calcium sorbate was immediately a bright purple-red which continued throughout the entire 33 days of the test.

While in the foregoing description only certain embodiments of the invention are set out in detail, it is apparent that many variations and changes may be made all within the spirit of the invention and the scope of the appended claims.

What is claimed is:

1. In a process for enhancing and stabilizing the color of cured meat, the step of incorporating into the meat sodium nitrite in an amount of from 0.0020% to 0.0156%, and calcium sorbate in an amount of from 0.01% to 0.8%, said percentages being by weight based on the weight of the meat, whereby the characteristic color of the cured meat is stabilized and preserved.

2. A process as set forth in claim 1 which includes incorporating into the meat sodium erythorbate, in addition to said sodium nitrite and calcium sorbate, in an amount of from 0.0313% to 0.0625%, said percentage being by weight based on the weight of the meat.

3. A process as set forth in claim 2 in which said sodium nitrite and sodium erythorbate are first added to the meat, and in which said calcium sorbate is later added to the meat as the meat is being mixed.

4. A process as set forth in claim 1 in which said calcium sorbate is incorporated in an amount of from 0.2% to 0.4% by weight based on the weight of the meat.

5. A process as set forth in claim 1 in which said sodium nitrite is incorporated in an amount of from 0.005% to 0.0100%, by weight based on the weight of the meat.

6. A process as set forth in claim 1 including the step of aging said meat mixture by holding it at a temperature of from about 36° F. to 38° F. for a period of at least six hours after its cure has been developed.

7. A cured meat mixture containing meat, from 0.0020 to 0.0156 percent of sodium nitrite and from 0.01 to 0.8 percent of calcium sorbate, said percentages being by weight based on the weight of the meat.

8. A cured meat mixture as set forth in claim 7 which contains also from 0.0313% to 0.0625% by weight, based on the weight of the meat, of sodium erythorbate.

9. A cured meat mixture as set forth in claim 8 which also contains from 2% to 4% by weight, based on the weight of the meat, of sodium chloride.

* * * * *

UNITED STATES PATENT AND TRADEMARK OFFICE
CERTIFICATE OF CORRECTION

PATENT NO. : 4,277,508

DATED : 7/7/81

INVENTOR(S) : Kunito Sato, et al

It is certified that error appears in the above—identified patent and that said Letters Patent is hereby corrected as shown below:

In Line 7 of the Abstract, "nitrate" should be --nitrite--.

In Line 7 of the Abstract, "inventionalso" should be --invention also--.

In Line 8 of the Abstract, "whichcontain" should be --which contain--.

In Line 9 of the Abstract, "developmentand" should be --development and--.

Signed and Sealed this

Twenty-seventh Day of October 1981

[SEAL]

Attest:

GERALD J. MOSSINGHOFF

Attesting Officer     Commissioner of Patents and Trademarks